United States Patent
Descheemaeker

(10) Patent No.: US 11,459,118 B2
(45) Date of Patent: Oct. 4, 2022

(54) PROTECTIVE COVER FOR AN AIRCRAFT COMPRISING ELECTROMAGNETS

(71) Applicant: AIRBUS SAS, Blagnac (FR)

(72) Inventor: Denis Descheemaeker, Blagnac (FR)

(73) Assignee: AIRBUS SAS

( * ) Notice: Subject to any disclaimer, the term of this patent is extended or adjusted under 35 U.S.C. 154(b) by 683 days.

(21) Appl. No.: 16/523,179

(22) Filed: Jul. 26, 2019

(65) Prior Publication Data

US 2020/0039662 A1 Feb. 6, 2020

(30) Foreign Application Priority Data

Aug. 1, 2018 (FR) ...................... 18 57194

(51) Int. Cl.
*B64F 1/00* (2006.01)

(52) U.S. Cl.
CPC .................... *B64F 1/005* (2013.01)

(58) Field of Classification Search
CPC ........................................ B64F 1/005
See application file for complete search history.

(56) References Cited

U.S. PATENT DOCUMENTS

| | | | | |
|---|---|---|---|---|
| 2,168,012 A | * | 8/1939 | Waner ................... | B64D 15/166 244/134 A |
| 2,391,241 A | * | 12/1945 | Hunter .................. | B64D 15/166 244/134 A |
| 2,394,063 A | * | 2/1946 | Hunter .................. | B64D 15/166 244/134 A |
| 4,763,783 A | * | 8/1988 | Talbot .................... | B65D 85/68 53/472 |
| 5,282,587 A | * | 2/1994 | Rodyniuk ............... | B64F 1/005 244/1 R |
| 5,611,501 A | * | 3/1997 | Crandley ................ | B64F 1/005 244/1 R |
| 5,845,873 A | | 12/1998 | Millard | |

FOREIGN PATENT DOCUMENTS

| | | | | |
|---|---|---|---|---|
| DE | 4421296 A1 | * | 12/1995 | ............. B64F 1/005 |
| GB | 2331972 A | | 6/1999 | |
| WO | 9412391 A1 | | 6/1994 | |
| WO | 2018025411 A1 | | 2/2018 | |

* cited by examiner

*Primary Examiner* — Behrang Badii
*Assistant Examiner* — Jalal C Coduroglu
(74) *Attorney, Agent, or Firm* — Lerner, David, Littenberg, Krumholz & Mentlik, LLP

(57) ABSTRACT

A protective cover for the protection of an aircraft having a fuselage and two wings, includes an anchoring system fixing the protective cover to the aircraft, a tarpaulin having a retracted position wherein it is gathered up and a deployed position wherein it is spread over the wing, a deployment device making the tarpaulin move from the retracted to the deployed position, an electromagnet fixed to the tarpaulin face against the wing, and having a deactivated state and an active state, a remote control, and a control system including a control unit in communication with the remote control. When the control unit receives activation information from the remote control, the control unit controls the deployment device, to make the tarpaulin move from the retracted position to the deployed position, and activates each electromagnet. When the control unit receives deactivation information from the remote control, the control unit deactivates each electromagnet.

7 Claims, 1 Drawing Sheet

PROTECTIVE COVER FOR AN AIRCRAFT COMPRISING ELECTROMAGNETS

FIELD OF THE INVENTION

The present invention relates to a protective cover for an aircraft which comprises electromagnets.

BACKGROUND OF THE INVENTION

When an aircraft is on the ground, it can undergo natural attacks such as for example hail and, in order to prevent the hail from damaging the aircraft, it is necessary to cover it.

This process is relatively long because it is necessary to stretch a tarpaulin manually over each aircraft and, moreover, personnel must be present at the time the hail falls.

BRIEF SUMMARY OF THE INVENTION

In order to best protect aircraft, it is therefore necessary to find a protective system which is simple and quick to use.

Aspects of the present invention propose a protective cover comprising electromagnets and a radio control system which makes it possible to quickly deploy and fix the protective cover.

A protective cover is proposed for the protection of an aircraft comprising a fuselage and two wings, the protective cover comprising:

- an anchoring system configured for fixing the cover to the aircraft,
- for each wing, a tarpaulin integral with the anchoring system and having a retracted position in which the tarpaulin is gathered up and a deployed position in which the tarpaulin is spread over the wing,
- for each tarpaulin, a deployment device provided for making the tarpaulin move from the retracted position to the deployed position,
- for each tarpaulin, at least one electromagnet fixed to the face of the tarpaulin which comes against the wing, where each electromagnet has a deactivated state in which it does not produce any magnetic force and an activated state in which it produces a magnetic field,
- a remote control, and
- a control system which comprises a control unit in communication with the remote control,
- where, when the control unit receives activation information from the remote control, the control unit is configured for controlling the deployment device, in order to make the tarpaulin move from the retracted position to the deployed, then for activating each electromagnet in order to make it change from the deactivated state to the activated state and where, when the control unit receives deactivation information from the remote control, the control unit is configured for deactivating each electromagnet in order to make it change from the activated state to the deactivated state.

Such a cover can therefore be deployed and fixed quickly and thus quickly ensure the protection de the aircraft.

Advantageously, the control system comprises a radio module, and the communication between the remote control and the control system is a radio communication between the radio module and the remote control.

Advantageously, communication between the remote control and the control system is a wired communication.

Advantageously, the anchoring system is in the form of a cylindrical-arc-shaped mattress.

According to a particular embodiment, the tarpaulin comprises at least one inflatable tube which extends along the tarpaulin and the deployment device comprises a system for inflating the inflatable tube.

According to a particular embodiment, the tarpaulin comprises a frame made of leaf spring which unfolds automatically as soon as it is released, and the deployment device comprises a locking system which keeps the tarpaulin in the retracted position and which becomes unlocked when instructed by the control unit.

According to a particular embodiment, in the retracted position, the tarpaulin is rolled up upon itself, and the deployment device comprises a locking system which keeps the tarpaulin in the retracted position and which becomes unlocked when instructed by the control unit.

BRIEF DESCRIPTION OF THE DRAWINGS

The features of the invention mentioned above, as well as others, will appear more clearly on reading the following description of an example of embodiment, the said description being given with reference to the appended drawings, in which.

DETAILED DESCRIPTION

Figure 1:
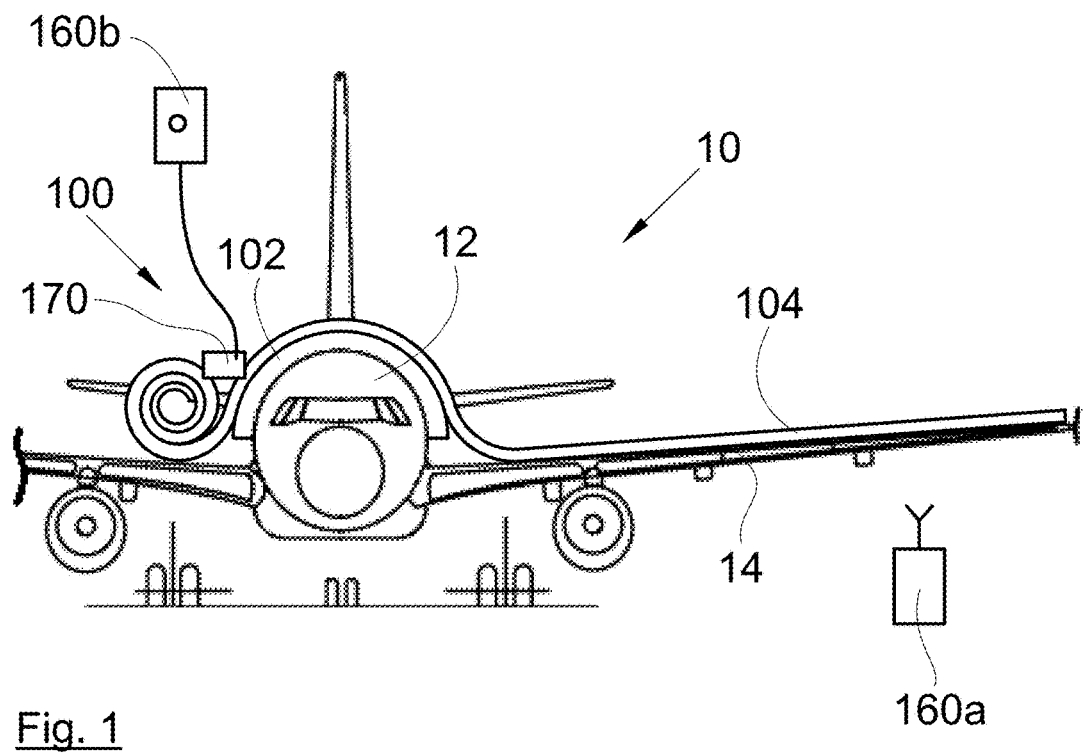
FIG. 1 is a front view of an aircraft equipped with a protective cover according to an embodiment of the invention.

In the following description, the terms relating to a position are used with reference an aircraft in position on the tarmac, that is to say as it is shown in FIG. 1.

Figure 2:
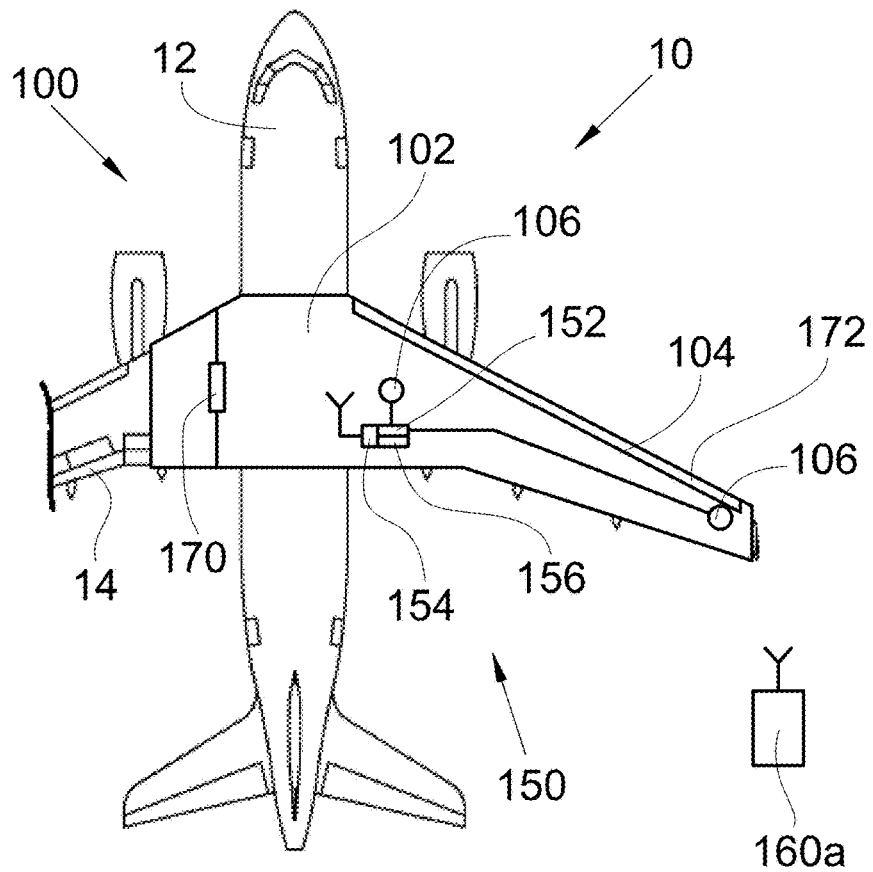
FIG. 2 is a plan view of the aircraft shown in FIG. 1.

FIG. 1 and FIG. 2 show an aircraft 10 which comprises a fuselage 12 and a wing 14 on each side of the fuselage 12.

The aircraft 10 is equipped with a protective cover 100 which comprises an anchoring system 102 which makes it possible to fix the protective cover 100 onto the aircraft 10, in particular over the fuselage 12 and which in this case has the overall shape of a cylindrical arc provided for closely fitting over the top part of the fuselage 12. The anchoring system 102 is positioned between the two wings 14 to be protected.

The protective cover 100 also comprises, for each wing 14, a tarpaulin 104 which is integral with the anchoring system 102 and which is provided for being positioned over the wing 14. The tarpaulins 104 are on each side of the anchoring system 102. Each tarpaulin 104 has a retracted position (on the left in the figures) and a deployed position (on the right in the figures). In the retracted position, the tarpaulin 104 is gathered up on itself and in the deployed position the tarpaulin 104 is spread over the wing 14.

The protective cover 100 also comprises a deployment device 170 which is provided for making each tarpaulin 104 move from the retracted position to the deployed position.

In order to ensure that the tarpaulin 104 is held in the deployed position on the wing 14, the tarpaulin 104 comprises at least one electromagnet 106 (two of them in this case) which is fixed under the tarpaulin 104, that is to say it is fixed to the face of the tarpaulin 104 which comes into contact with the wing 14. Each electromagnet 106 has a deactivated state in which it does not produce any magnetic force and an activated state in which it produces a magnetic field.

The protective cover 100 also comprises a control system 150 which comprises a control unit 152 and a battery 156 which powers the control unit 152, the deployment device 170 and each electromagnet 106.

The control unit 152 conventionally comprises, connected by a communication bus: a processor or CPU ("Central Processing Unit"); a random access memory RAM ("Random Access Memory"); a read only memory ROM ("Read Only Memory"); a storage unit such as a hard disk or a storage medium reader and at least one communication interface, making it possible for the control unit 152 to communicate with each electromagnet 106.

The processor is capable of executing instructions loaded in the RAM from the ROM, from an external memory (not shown), from a storage medium (such as an SD card), or from a communication network. When the equipment is powered on, the processor is capable of reading instructions from the RAM and of executing them. All or some of the algorithms can be implemented in software form by execution of a set of instructions by a programmable machine, for example a DSP (standing for "Digital Signal Processor" in English) or a microcontroller, or can be implemented in hardware form by a machine or a dedicated component, for example an FPGA (standing for "Field-Programmable Gate Array" in English) in English) or an ASIC (standing for "Application-Specific Integrated Circuit" in English).

The protective cover 100 also comprises a remote control 160a-b and the control system 150 is in communication with the remote control 160a-b. According to a first embodiment, the communication between the remote control 160b and the control system 150 is wired, and according to a second embodiment, the communication between the remote control 160a and the control system 150 is a radio communication.

In this latter case, the control system 150 comprises a radio module 154 powered by the battery 156 and controlled by the control unit 152 and the radio communication radio is established between the radio module 154 and the remote control 160a.

The radio module 154 and the remote control 160a use a radio protocol in order to communicate, such as for example WIFI®, Bluetooth® or any other radio protocol.

Thus, when the control unit 152 receives activation information from the remote control 160a-b, the control unit 152 controls the deployment device 170 in order to make the tarpaulin 104 move from the retracted position to the deployed position, then to activate each electromagnet 106 in order to make it change from the deactivated state to the activated state and when the control unit 152 receives deactivation information from the remote control 160a-b, the control unit 152 deactivates each electromagnet 106 in order to make it change from the activated state to the deactivated state.

Thus, the deployment and the fixing of each protective cover 100 is quick.

In the case of radio communication between the remote control 160a and the control system 150, the information passes through the radio module 154 which receives activation information from the remote control 160a, the radio module 154 then informs the control unit 152 which controls the deployment device 170 in order to make the tarpaulin 104 move from the retracted position to the deployed position, then activates each electromagnet 106 in order to make it change from the deactivated state to the activated state.

Conversely, when the radio module 154 receives deactivation information from the remote control 160a, the radio module 154 informs the control unit 152 which deactivates each electromagnet 106 in order to make it change from the activated state to the deactivated state and then each tarpaulin 104 is manually returned to the retracted position.

Thus, it is possible to place a protective cover 100 in a preventive manner on each aircraft 10 and a single operator can remotely control each protective cover 100 by activating them simultaneously in order to fix them simultaneously using the same remote control 160a, thus saving time and resources.

In the case of a wired communication, an operator actuates the remote control 160b which communicates with the control unit 152 which controls the deployment device 170 in order to deploy the tarpaulin 104. The activation of the electromagnets 106 then takes place automatically as soon as the tarpaulin 104 is in the deployed position, or manually, still by the intermediary of the remote control 160b. Conversely, when the control unit 152 receives deactivation information from the remote control 160b, the control unit 152 deactivates each electromagnet 106 in order to make it change from the activated state to the deactivated state and then each tarpaulin 104 is returned manually to the retracted position.

Each tarpaulin 104 is fixed by one of its ends to the anchoring system 102 whilst the other end is free.

In the retracted position, each tarpaulin 104 is gathered up close to the fuselage 12 and the deployed position consists of the tarpaulin 104 being deployed over the wing 14 from the fuselage 12 to the end of the wing 14.

According to a particular embodiment, the tarpaulin 104 comprises at least one inflatable tube 172 which extends along the tarpaulin 104 and the deployment device 170 comprises a system for inflating the said inflatable tube 172 which is activated by the control unit 152. The inflation system can for example be a pump or a compressed gas cartridge.

According to another particular embodiment, the tarpaulin 104 comprises a frame made of leaf spring which deploys automatically as soon as it is released.

According to another particular embodiment, in the retracted position, the tarpaulin 104 is rolled up upon itself as shown in FIG. 1.

In both of these latter cases, the deployment takes place automatically as soon as the tarpaulin 104 is free. The deployment device 170 therefore comprises a locking system which keeps the tarpaulin 104 in the retracted position and which unlocks under the control of the control unit 152. The locking system can for example be of the electric striker type.

Other embodiments can be envisaged. For example, the tarpaulin 104 can be constituted by several sheets mounted such that they slide over one another.

The tarpaulin 104 is for example a foam mattress.

The anchoring system 102 has the form of a cylindrical-arc-shaped mattress which can be placed over the fuselage 12 without damaging it.

In another embodiment, each tarpaulin 104 is fixed to the associated wing 14, for example at the junction between the wing 14 and the fuselage 12 by any appropriate means such as for example hooks and there is no longer a circular-arc-shaped mattress.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A protective cover for the protection of an aircraft comprising a fuselage and two wings, the protective cover comprising:
    an anchoring system configured for fixing the protective cover to the aircraft,
    for each wing, a tarpaulin integral with the anchoring system and having a retracted position in which the tarpaulin is gathered up and a deployed position in which the tarpaulin is spread over the wing,
    for each tarpaulin, a deployment device provided for making the tarpaulin move from the retracted position to the deployed position,
    for each tarpaulin, at least one electromagnet fixed to the face of the tarpaulin which comes against the wing, where each electromagnet has a deactivated state in which the electromagnet does not produce any magnetic force and an activated state in which the electromagnet produces a magnetic field,
    a remote control, and
    a control system comprising a control unit in communication with the remote control,
    wherein, when the control unit receives activation information from the remote control, the control unit is configured for controlling the deployment device, in order to make the tarpaulin move from the retracted position to the deployed position, then for activating each electromagnet in order to make the electromagnet change from the deactivated state to the activated state and
    wherein, when the control unit receives deactivation information from the remote control, the control unit is configured for deactivating each electromagnet in order to make the electromagnet change from the activated state to the deactivated state.

2. The protective cover according to claim 1, wherein the control system comprises a radio module, and wherein the communication between the remote control and the control system is a radio communication between the radio module and the remote control.

3. The protective cover according to claim 1, wherein the communication between the remote control and the control system is a wired communication.

4. The protective cover according to claim 1, wherein the anchoring system is a cylindrical-arc-shaped mattress.

5. The protective cover according to claim 1, wherein the tarpaulin comprises at least one inflatable tube extending along the tarpaulin and wherein the deployment device comprises a system for inflating the inflatable tube.

6. The protective cover according to claim 1, wherein the tarpaulin comprises a frame made of leaf spring configured to unfold automatically as soon as the leaf spring is released, and wherein the deployment device comprises a locking system configured to keep the tarpaulin in the retracted position and configured to be unlocked when instructed by the control unit.

7. The protective cover according to claim 1, wherein, in the retracted position, the tarpaulin is rolled up upon itself, and wherein the deployment device comprises a locking system configured to keep the tarpaulin in the retracted position and configured to be unlocked when instructed by the control unit.

* * * * *